US005451127A

United States Patent [19]

Chung

[11] Patent Number: 5,451,127

[45] Date of Patent: Sep. 19, 1995

[54] DUAL-FUNCTION ELECTRICAL HAND DRILL

[76] Inventor: Lee-Hsin-Chih Chung, No. 21-8 Shang-San-Tso-Wu, Chung-Li City, Taoyuan Hsien,

[21] Appl. No.: 229,339

[22] Filed: Apr. 12, 1994

[51] Int. Cl.$^{6}$ .............................................. B23B 45/16

[52] U.S. Cl. ......................................... 408/20; 173/47

[58] Field of Search ....................... 408/20; 173/47, 48

[56] References Cited

U.S. PATENT DOCUMENTS 4,158,313 6/1979 Smith .................................... 173/47

4,710,313 12/1987 Koehler et al. ....................... 408/20

FOREIGN PATENT DOCUMENTS 2920065 11/1980 Germany .............................. 173/47

*Primary Examiner*—Steven C. Bishop

*Attorney, Agent, or Firm*—Steven M. Rabin

[57] ABSTRACT

A dual-function electrical hand drill includes an electrical motor to which a driving shaft is coupled via a speed reduction gear train. A chuck is releasably secured to the driving shaft to be rotatable therewith. A setting ring is provided to change the rotation speed and thus the output torque by applying force to the speed reduction gear train via the compression of a helical spring. A serrated member, secured to the driving shaft, is provided to be movable between a disabled position and an enabled position in which enabled position, the serrated member engages a counterpart serration and is biased by a spring to allow the chuck and the bit secured thereto to move to and fro by the sliding between the serrations when the bit is reacted by a work piece. The movement of the serrated member between the enabled position and the disabled position is controlled by the setting ring so that the selection of both the output torques and the operation modes can be accomplished by a single setting member.

17 Claims, 8 Drawing Sheets

DUAL-FUNCTION ELECTRICAL HAND DRILL

FIELD OF THE INVENTION

The present invention relates generally to a dual-function electrical hand drill and in particular to the mode switching device for switching between two operation modes of the dual-function electrical hand drill.

BACKGROUND OF THE INVENTION

A dual-function electrical hand drill provides not only a rotation output but also a to-and-fro vibration output. A mode switch is provided on such a dual-function hand drill to switch between rotation output mode and vibration output mode. Such a dual-function electrical hand drill is available in the market and an exemplary structure thereof is illustrated in FIGS. 7 and 8 of the accompanying drawings. As illustrated, the dual-function electrical hand drill, designated with the reference numeral 900, generally has a pistol shape. A handle 910 having a power switch 911 is provided to be held by hand of an operator. A casing 912 extends forward from the top of the handle 910 to house therein a torque source or a rotation source, such as an electrical motor 913 (see FIG. 8). The motor 913 is controlled by the power switch 911.

A chuck 914, which is not shown in FIG. 8, is mounted on the front end of the casing 912 to be rotatable with a spindle 932 (FIG. 8) of the motor 913 by the coupling of a driving shaft 930. The dual-function electrical hand drill 900 further comprises a torque setting ring 915 which allows a user to set to the desired output torque. In the example illustrated, the output torque levels are respectively indicated by 1–5 and a "bit" mark which represents the maximum output level. An indicating mark 916 is provided on the casing 912 to show the selection of the output level.

The dual-function electrical hand drill 900 further comprises a mode switch ring 917, on which two marks 918 and 919 are provided to respectively represent the rotation mode and the vibration mode. The two output modes are selected by rotating the mode switch ring 917 to have one of the marks 918 and 919 registered with a marker 920 formed on the casing 912.

To operate the dual-function electrical hand drill 900 in the vibration mode, the output torque level must be set to the maximum output, the "bit" sign, and then the mode switch ring 917 is rotated to select the oscillation mode. This is a two-step operation.

FIG. 8 is a cross-sectional view of the conventional dual-function electrical hand drill 900 with the casing 912 and the chuck 914 removed. The dual-function electrical hand drill 900 comprises a speed reduction gear train 940, basically constituted by three planetary gear sees, enclosed by a stationary enclosure member 42 which is fixed to the motor 913. The speed reduction gear train 940 is coupled between the driving shaft 930 and the spindle 932 of the motor 913 so as to transmit the rotation of the spindle 932 to the driving shaft 930.

Torque setting means 950, which is controlled by the torque setting ring 915, is provided to control the output speed of the last stage planetary gear set so as to change the output speed and thus the output torque of the driving shaft 930.

Mode selection means 960, which is controlled by the mode switch ring 917, is provided on the front end of the dual-function electrical hand drill 900. The mode selection means 960 comprises a serrated-member pair which, if allowed to engage each other, moves the driving shaft 930 to and fro during rotation, so as to provide the vibration output. Means for disengaging the serrated-member pair is provided to allow the driving shaft 930 to be rotated without the to-and-fro movement.

Although the conventional dual-function electrical hand drill shown in FIGS. 7 and 8 works well, there are several disadvantages existing in the structure of the known dual-function electrical hand drill. These disadvantages include:

(1) It requires complicated operation to switch from the rotation output mode to the vibration output mode, for it needs a two-step operation, namely the torque setting step (to maximum torque) and the mode switch step.

(2) It requires the torque setting ring to be set to the maximum output level before the vibration mode is selected and since the two settings are conducted independently by turning two different setting members, it may cause an operation fault in switching to the vibration mode without setting to the maximum torque output in advance.

(3) Due to the use of two setting rings, the overall length of the electrical hand drill has to be increased and this causes a worse operation controllability for it may generate a greater reaction torque to the hands holding the drill.

It is therefore desirable to provide a dual-function electrical hand drill which is needs only one setting member so as to overcome the above-mentioned problems associated with the conventional dual-function electrical hand drill.

SUMMARY OF THE INVENTION

The principal objective of the present invention is to provide a dual-function electrical hand drill which has a single setting member to set between different torque output levels and also switch between different operation modes.

To achieve the above objective-i there is provided a dual-function electrical hand drill which comprises an electrical motor to which a driving shaft is coupled via a speed reduction gear train. A chuck is releasably secured to the driving shaft to be rotatable therewith. A setting ring is provided to change the rotation speed and thus the output torque by applying force to the speed reduction gear train via the compression of a helical spring. A serrated member, secured to the driving shaft, is provided to be movable between a disabled position and an enabled position in which enabled position, the serrated member engages a counterpart serration and is biased by a spring to allow the chuck and the bit secured thereto to move to and fro by the sliding between the serrations when the bit is reacted by a work piece. The movement of the serrated member between the enabled position and the disabled position is controlled by the setting ring so that the selection of both the output torques and the operation modes can be accomplished by a single setting member.

BRIEF DESCRIPTION OF THE DRAWING

The present invention will be better understood from the following description of a preferred embodiment of the present invention, with reference to the attached drawings, wherein.

DETAILED DESCRIPTION OF THE PREFERRED EMBODIMENT

Figure 1:
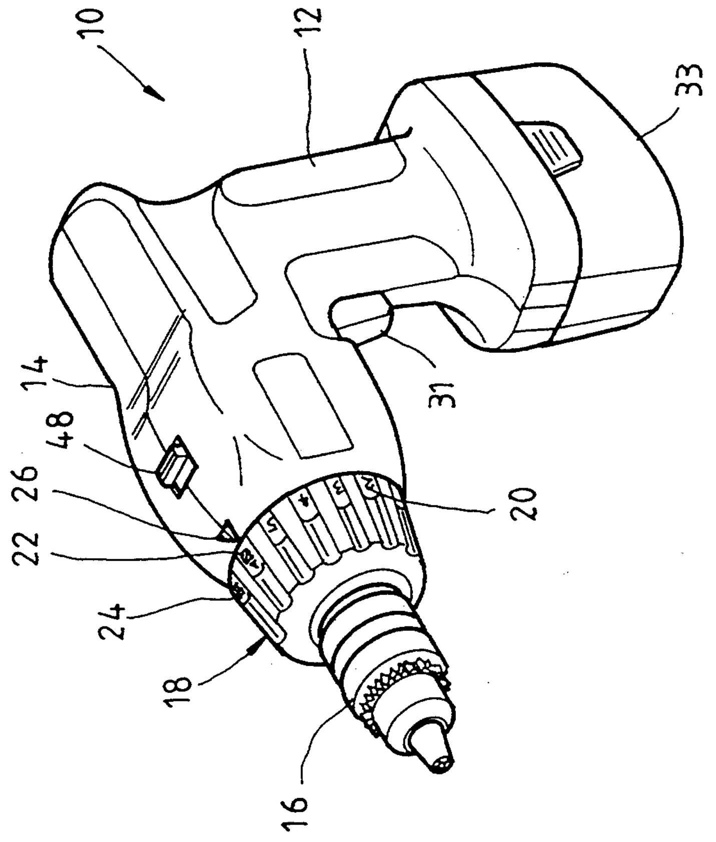
FIG. 1 is a perspective view showing a dual-function electrical hand drill constructed in accordance with the present invention.

With reference to the drawings and in particular FIG. 1, wherein a dual-function electrical hand drill constructed in accordance with the present invention, generally designated by the reference numeral 10, is shown, the dual-function electrical hand drill 10 may assume a pistol-like shape having a handle 12 to be held by hands of an operator, a casing 14 extending from a top end of the handle 12 to define therein an interior space for accommodating essential parts (to be described hereinafter) for generating and transmitting torque or rotation to a chuck 16 rotatably mounted to a front end of the casing 14.

A setting ring 18 is provided on the front end of the casing 14 to set the desired output torque level and to switch the electrical hand drill 10 between a rotation mode and a vibration mode, which will be further discussed hereinafter.

To provide a visual reference, a number of marks 20, which are numbered 1–5 in the embodiment illustrated, are formed on the setting ring 18' to represent different torque output levels of the rotation mode. A further mark 22, indicating the maximum torque output level of the rotation mode, is also provided on the setting ring 18. There is still one more mark 24 provided on the setting ring 18 to indicate the vibration mode of the dual, function electrical hand drill 10. A reference indicator 26 is provided on the casing 14 to indicate the selection of the torque output levels and the operation modes 20, 22 and 24.

Figure 2:
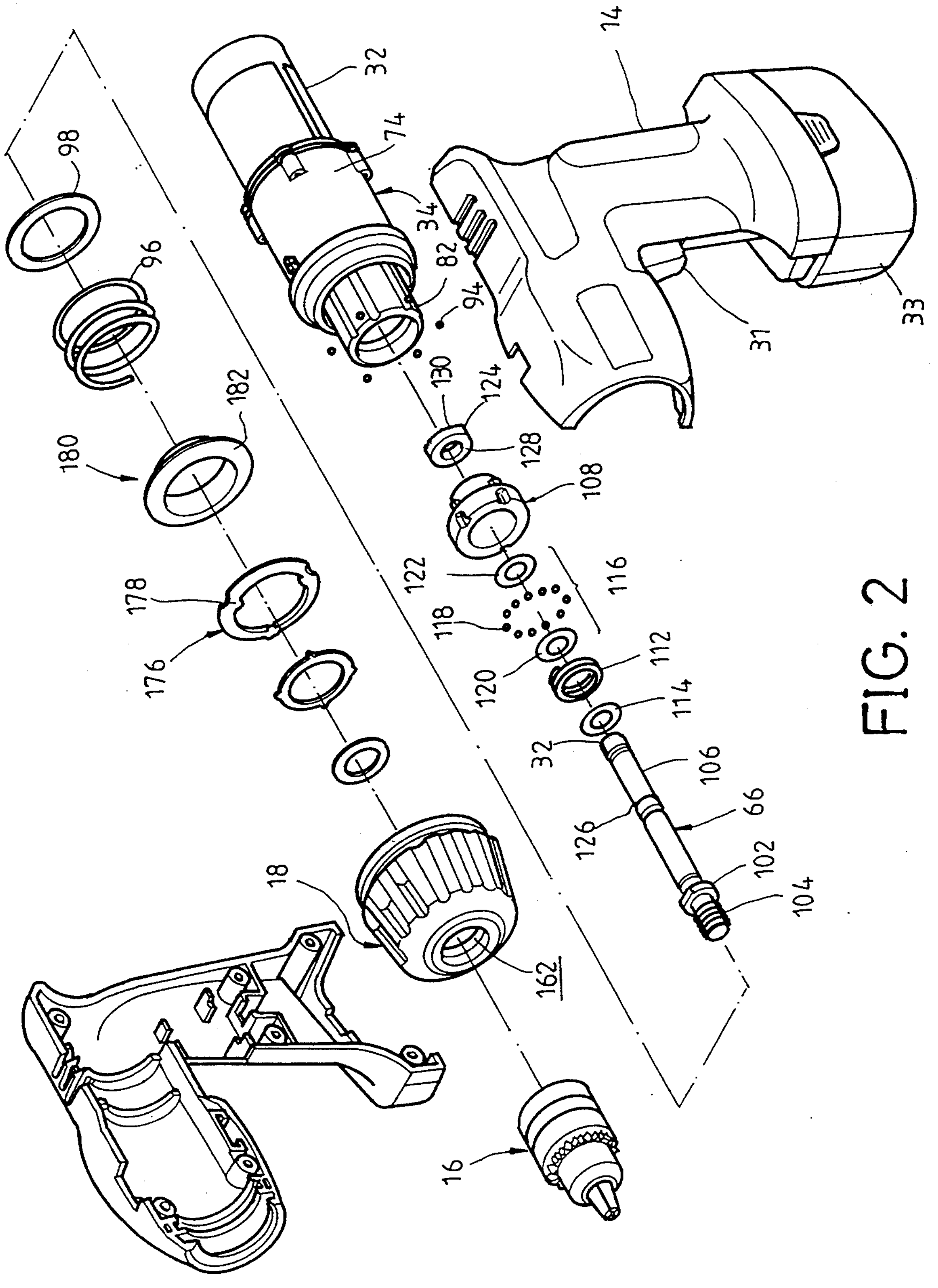
FIG. 2 is an exploded perspective view showing the dual-function electrical hand drill of the present invention.

With particular reference to FIG. 2, wherein an exploded perspective view of the dual-function electrical hand drill 10 is shown, the hand drill 10 comprises a torque or rotation source, such as an electrical motor 30 which is fixed inside the interior space defined by the casing 14. A power switch 31 (FIG. 1) disposed on the handle 12 and accessible by the operator is provided to turn on/off the motor 30. The motor 30 may be powered by battery set. 33, as illustrated in FIG. 1, or external power source (not shown).

Figure 3:
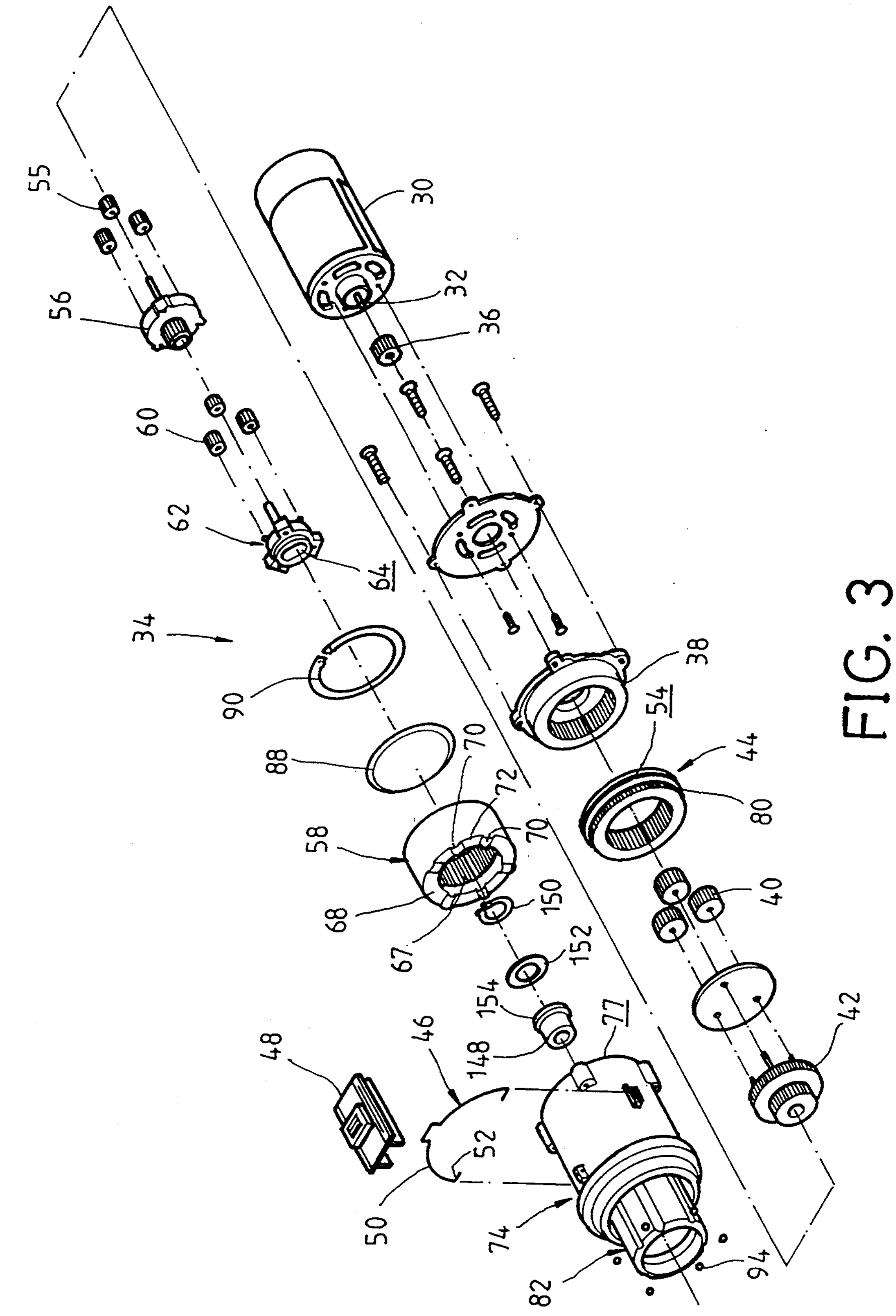
FIG. 3 is an exploded view showing an example of the reduction gear system that is adaptable in the dual-function electrical hand drill of the present invention.

With further reference to FIG. 3, the motor 30 has a spindle 32 to which speed reduction means 34 is coupled to rotate about a rotational axis. The speed reduction means 34 comprises a number of gears forming a speed reduction gear train which may have any structure that is well known to those having ordinary skill in mechanical engineering. An example of the speed reduction gear train is illustrated in FIG. 3.

With particular reference to FIG. 3, the speed reduction means 34 adapted in the dual-function electrical hand drill 10 comprises three planetary gear sets, of which the first planetary gear set comprises a first sun gear 36 secured to the spindle 32 of the motor 30. The first planetary gear set has a first ring gear 38 fixed to the motor 30 to be stationary inside the casing 14. The first planetary gear set also comprises first planetary gears 40 which are engageable between the first sun gear 36 and the first ring gear 38 and are respectively rotatably mounted to sun gear 42 of the second planetary gear set.

The second planetary gear set has a ring gear 44 which is movable under the control of a switching lever 46 which is in turn controlled by a switch 48 slidably mounted on the casing 14 (see FIG. 1) and accessible by the operator to set between a high speed condition or a low speed condition.

The switching lever 46 has two legs 50 on which two inward projections 52 are formed to be receivable within a circumferential slot 54 formed on the movable second ring gear 44 so as to move the second ring gear 44 between a rotatable position, corresponding to the high speed condition of the speed reduction means 34, and a fixed position, corresponding to the low speed condition.

The second planetary gear set has planetary gears 55 rotatably mounted to sun gear 56 of the third planetary gear set which is rotated about the rotational axis of the spindle 32. The third sun gear 86 is coupled to an adjusting ring gear 58, which functions as the ring gear of the third planetary gear set, via planetary gears 60 of the third planetary gear set. The third planetary gears 60 are rotatably mounted to an adaptor 62 which has an engaging hole 64 formed thereon to receive and thus drivingly engage an elongated driving shaft 66 (see FIG. 2) which will be further discussed hereinafter.

As illustrated, the adjusting ring gear 58 comprises an elongated cylinder inside which inner teeth 67 are formed. The adjusting ring gear 58 has an inward flange 68 formed on an end to define a ring-like end surface on which a plurality of round raised sections 70 are formed, preferably in an equally-spaced manner, and defining therebetween recessed sections 72.

The speed reduction means 34 also comprises a housing member 74 defining therein a first interior space 76 (FIG. 6) into which the speed reduction gear train is received through an end opening 77 thereof. The first interior space 76 has formed therein a ring gear 78 engageable with the an outer toothed section 80 of the movable ring gear 44 to allow the movable ring gear 44 to be fixed-relative to the housing member 74 which is the fixed position of the ring gear 44.

The housing member 74 is fixed to the motor 30 by means of for example screws to be stationary relative to the casing 14 of the electrical hand drill 10. The securing of the housing member 74 to the motor 30 provides a complete enclosure of the speed reduction gear train inside the housing member 74.

Figure 6:
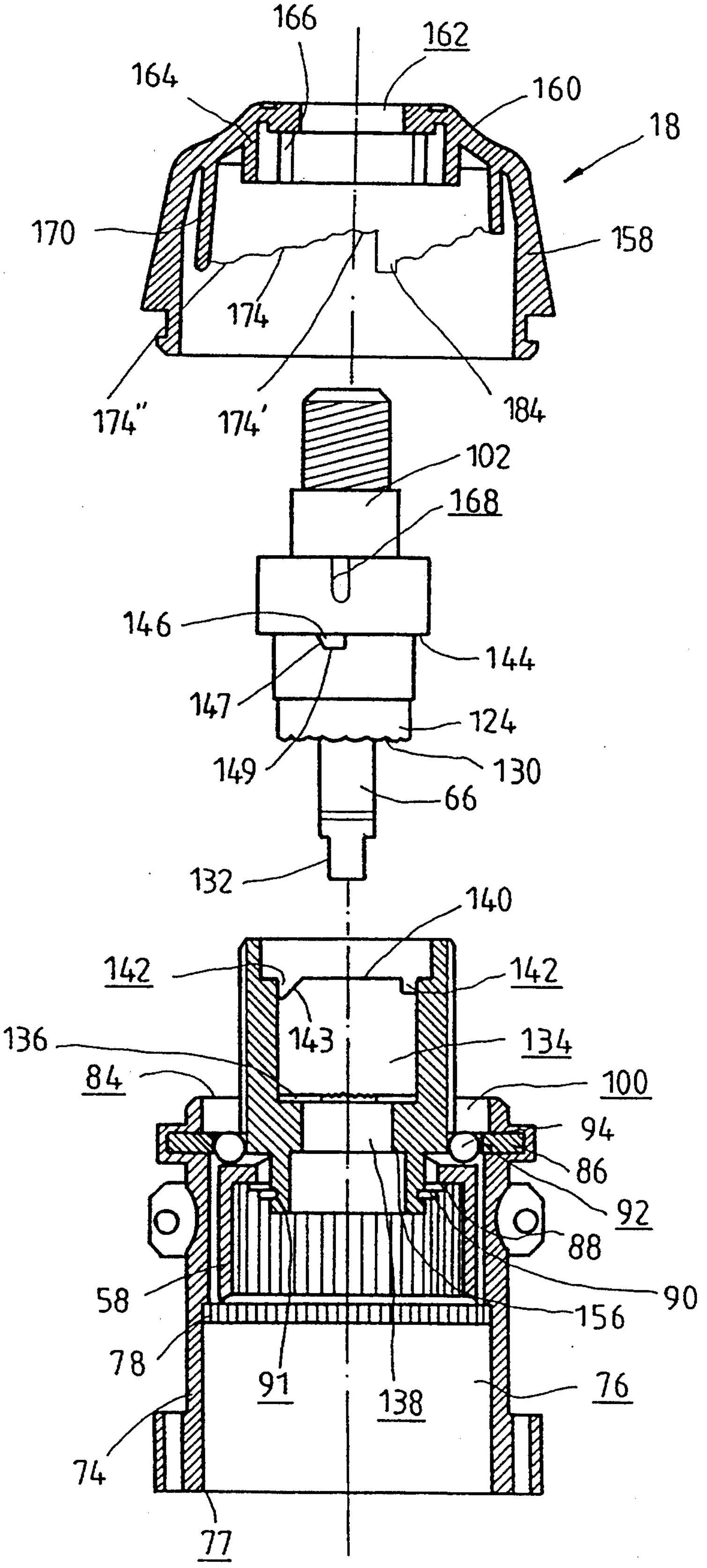
FIG. 6 is an exploded cross-sectional view showing a portion of the-dual-function electrical hand drill of the present invention.
Figure 7:
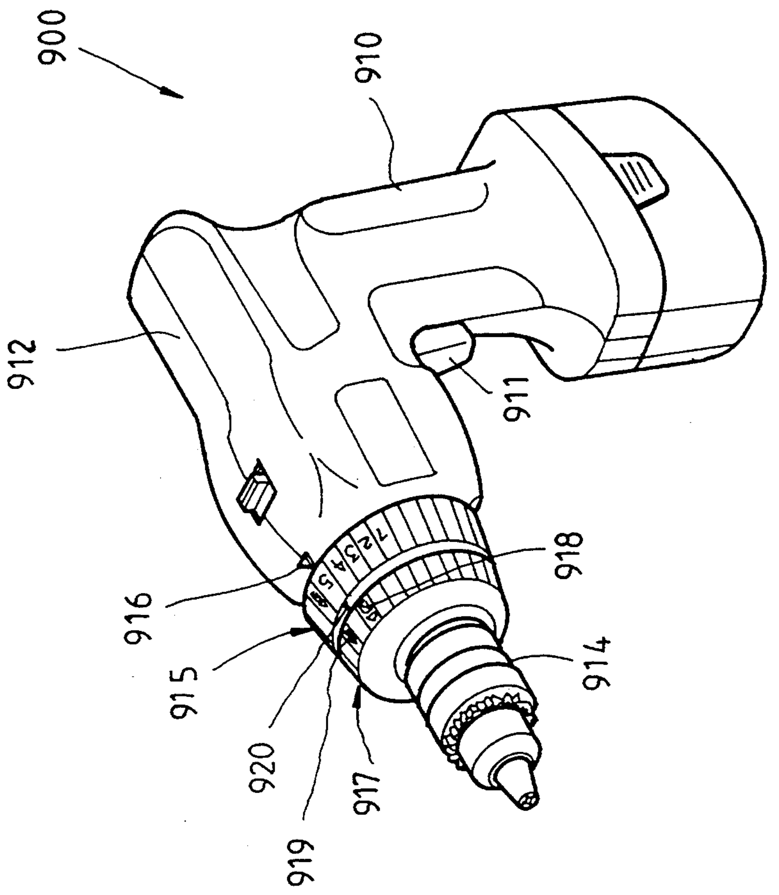
FIG. 7 PRIOR ART
FIG. 7 is a perspective view showing a conventional dual-function electrical hand drill.
Figure 8:
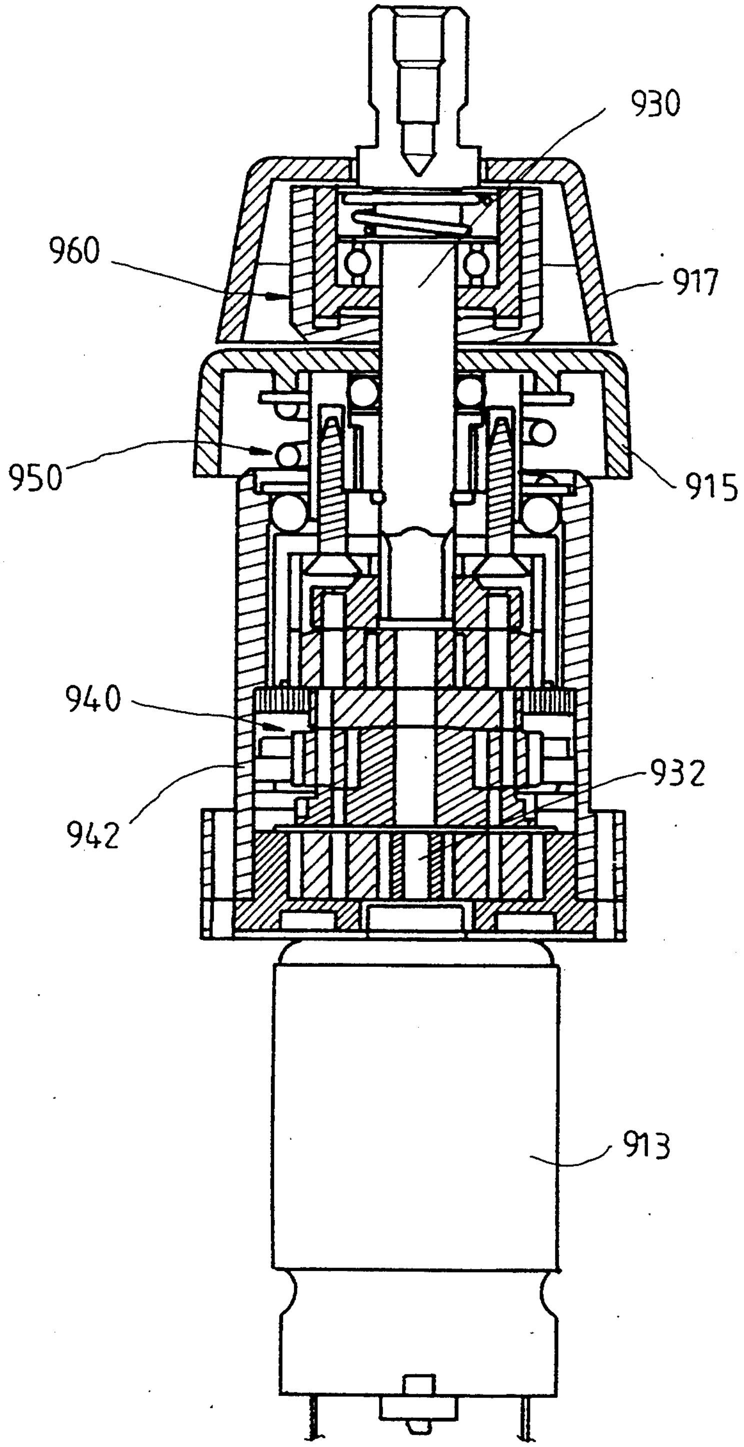
FIG. 8 PRIOR ART
FIG. 8 is a cross-sectional view of the conventional dual-function electrical hand drill shown in FIG. 7.

With reference to FIGS. 2, 3 and 6, a vibration generating base 82 is provided as a cylindrical member which is smaller in diameter than a top opening 84 (FIG. 6) of the housing member 74 and is partially received and secured within the top opening 84 of the housing member 74. The vibration generating base 82 has a circumferential flange 86. Preferably, the housing member 74 is made of plastics or the like by injection molding to form an inner circumferential groove which tightly encloses the outer edge of the flange 86 so as to fix the vibration generating base 82 relative to the housing member 74.

The adjusting ring gear 58 is rotatably secured to an end of the vibration generating base 82 which is located inside the housing member 74 by means of a bearing ring 88 and a C-clip 90. The C-clip 90 is received within a circumferential groove 91 formed on the end of the vibration generating base 82 disposed inside the housing member 74 to secure the adjusting ring gear 58 to the vibration generating base 82 and thus the housing member 74.

Figure 4:
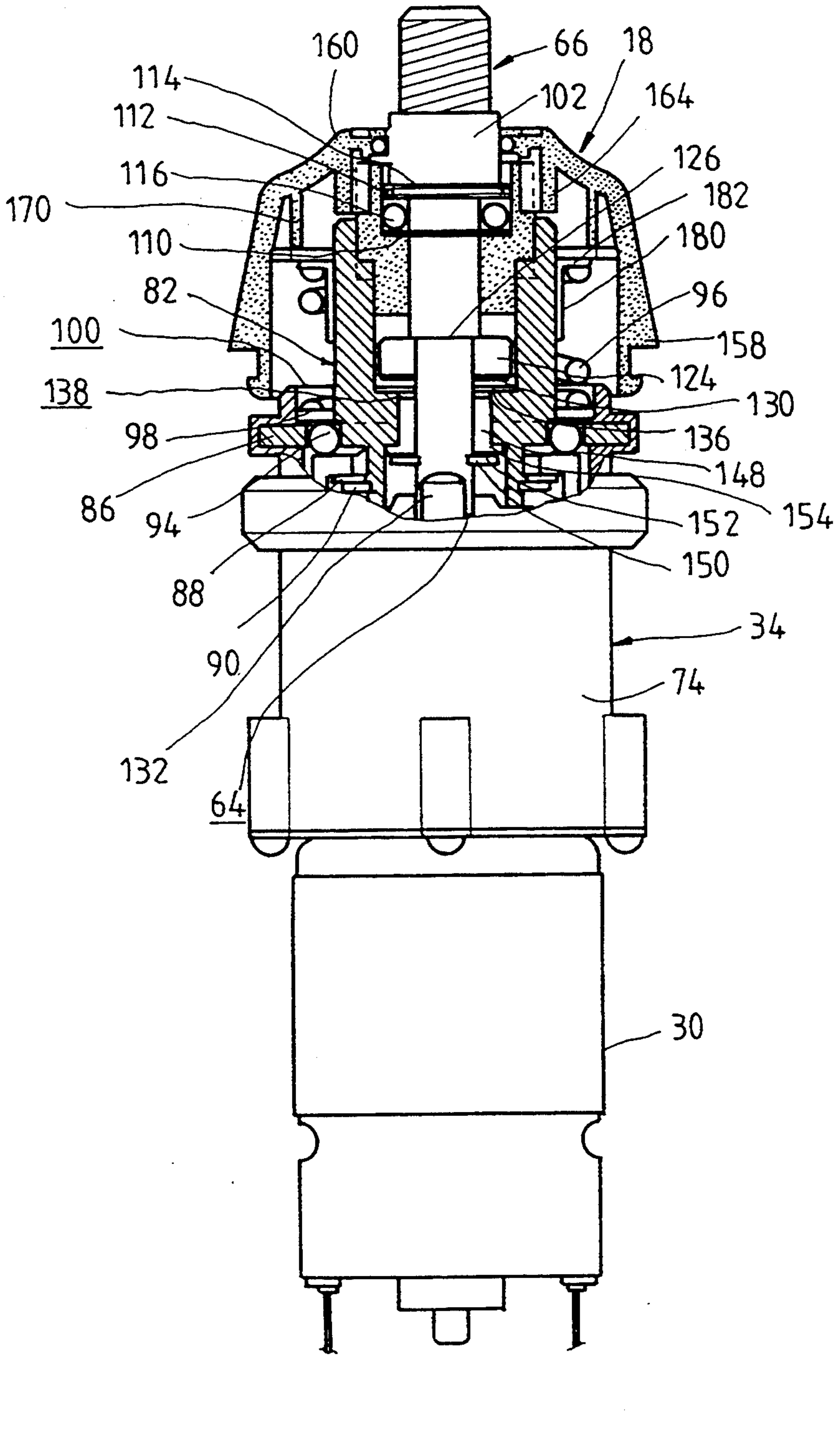
FIG. 4 is a cross-sectional view showing the dual-function electrical hand drill of the present invention in the rotation mode.
Figure 5:
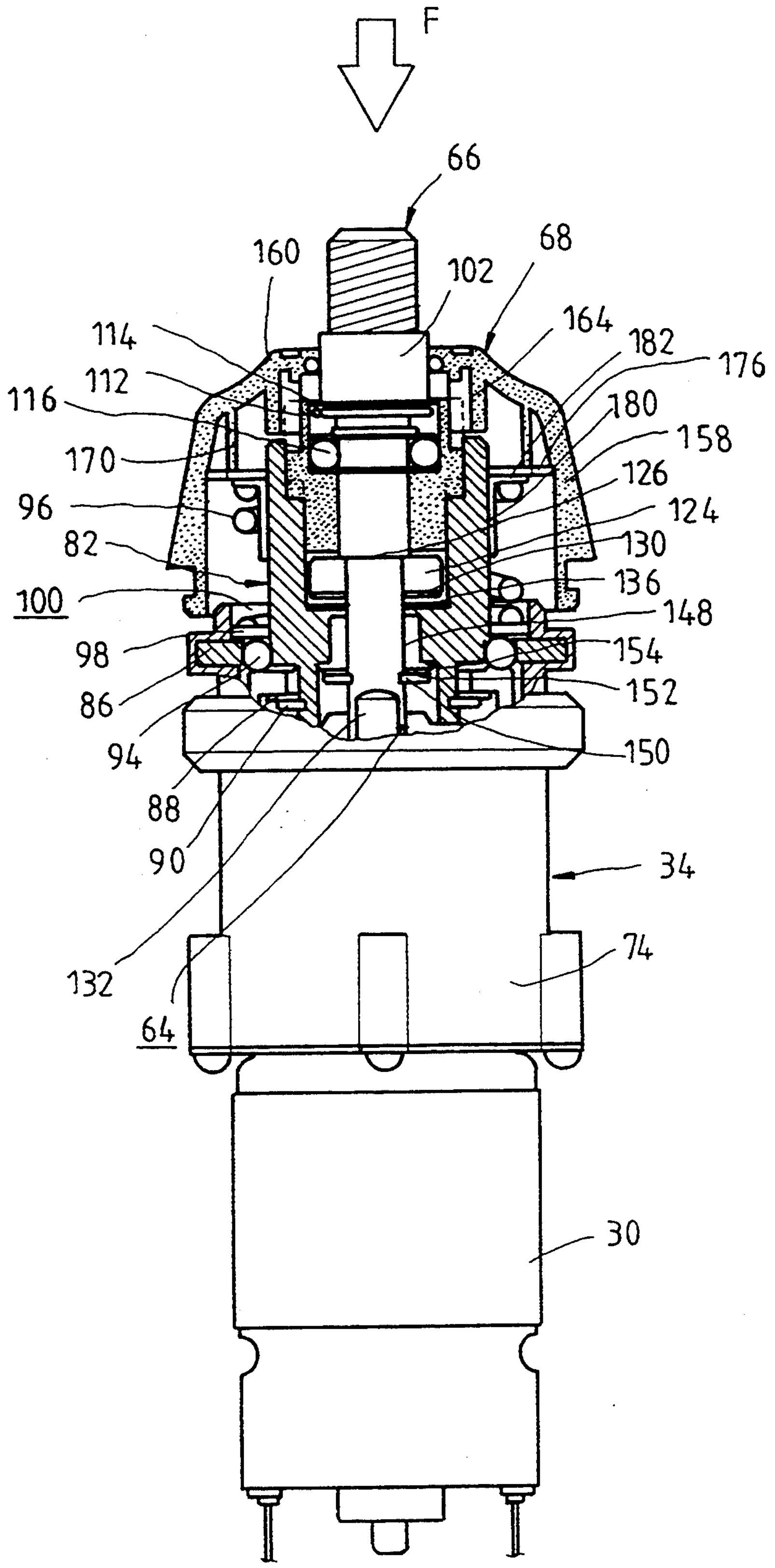
FIG. 5 is another cross-sectional view showing the dual-function electrical hand drill of the present invention in the vibration mode.

A plurality of holes 92 (FIG. 6) are formed on the flange 86 of the vibration generating base 82 to each receive therein a spherical member 94 as shown in FIGS. 4 and 5. The spherical members 94 are received within the holes 92 in such a manner that they are partially projecting out of the holes 92 and entering into and resting in the recessed sections 72 of the inward flange 68 of the adjusting ring gear 58. A helical spring 96 (also see FIGS. 4 and 5) is loosely fit over the cylindrical vibration generating base 82 to have one end thereof acting against the spherical members 94 to serve as biasing means for forcing the spherical members 94 against the inward flange 68 of the adjusting ring gear 58. Preferably, a washer 98 is disposed between the helical spring 96 and the spherical members 94.

Preferably, the top opening 84 of the housing member 74 defines a ring-like groove 100 (FIG. 6) within which the end of the spring 96 acting upon the spherical members 94 is received so as to prevent the helical spring 96 from disengaging from the spherical members 94.

With reference to FIG. 2, the driving shaft 66 has a circumferential ring 102 formed thereon which divides the length of the driving shaft 66 into an outer section 104 to which the chuck 16 is releasably secured with any means known to those having ordinary skill is in the art and an inner section 106 which is partially received within the vibration generating base 82 and the housing member 74 to engage the speed reduction gear train.

Further referring to FIGS. 4–6, a mode switching ring 108 is rotatably and movably fit over the inner section 106 of the driving shaft 66. The mode switching ring 108 defines therein a circumferential shoulder 110 which cooperates with the circumferential ring 102 of the driving shaft 66 to retain therebetween biasing means, preferably a conical spring 112, having one end abutting against the circumferential ring 102 of the driving shaft 66, preferably with a washer 114 therebetween. The opposite end of the conical spring 112 is supported on the circumferential shoulder 110 of the mode switching ring 108 by means of bearing means 116 which comprises, in general, a number of bearing balls 118 sandwiched between two washers 120 and 122 (see FIG. 2).

A ring member 124 is press fit over the inner section 106 of the driving shaft 66 at a pre-determined position, preferably defined by a circumferential shoulder 126 formed on the inner section 106 of the driving shaft 66. The ring member 124 has a first end surface 128 abutting against the circumferential shoulder 126 to position the ring 124 on the pre-determined position. The first end surface 128 of the ring 124 has a diameter substantially greater than the circumferential shoulder 126 so as to serve as a stop for limiting the movability of the mode switching ring 108 relative to the driving shaft 66. The ring member 124 has a second, opposite end surface 130 on which a serration is formed.

The inner section 106 of the driving shaft 66 is rotatably receivable within the vibration generating base 82 to have a free end 132 of the inner section 106 of the driving shaft 66, which is shaped to be in driving engagement with the engaging hole 64 of the adapter 62, extend into and thus engage the engaging hole 64 so as to be coupled to the speed reduction means 34.

The cylindrical vibration generating base 82 has formed therein a recess 134 having a bottom 136 which is serrated in correspondence with the serrated end surface 130 of the ring member 124. A through hole 138 is formed on the serrated bottom 136 to allow the free end 132 of the driving shaft 66 to extend therethrough to be engaged by the engaging hole 64 of the adapter 62.

A circumferential step 140 is formed in the recess 134 with a plurality of notches 142, preferably three, formed thereon. It should be noted that in the drawings, only two of the notches 142 are visible. Each of the notches 142 is provided with an inclined side edge 143. Corresponding to the step 140 of the recess 134, the mode switching ring 108 has a circumferential shoulder 144 formed thereon to be supported by and movable on the step 142. The circumferential shoulder 144 has a plurality of projections 146, corresponding to the notches 142 of the step 140, formed thereon to be receivable within the notches 142. The rotation of the mode switching ring 108 moves the shoulder 144 thereof relative to the step 140 so as to have the projections 146 trapped into the notches 142 and the shoulder 144 in direct contact with the step 142. Each of the projections 146 is provided with an inclined side 147 to cooperate with the inclined side edge 143 of the notches 142 for helping the projections 146 moving out of the notches 142 when the mode switching ring 108 is rotated reversely. Once the projections 146 are moved out of the notches 142, the shoulder 144 is out of contact engagement with the step 140 and is supported on the step 140 by the projections 146 which are provided with a flat lower end 149.

FIG. 5 shows the condition when the projections 146 of the mode switching ring 108 are rotated to move into the notches 142 of the vibration generating base 82 and this corresponds to the vibration mode of the operation of the dual-function electrical hand drill 10. FIG. 4 shows a different condition wherein the projections 146 of the mode switching ring 108 are moved out of the notches 142 which corresponds to the rotation mode of the operation of the dual-function electrical hand drill 10.

The driving shaft 66 is rotatably secured within the vibration generating base 82 which is in turn fixed to the housing member 74 and thus the motor 30 and the casing 14 by means of a bushing 148 which is disposed between the hole 138 and the shaft 66 and is fixed to the driving shaft 66 by a C-clip 150, preferably with a washer 152 therebetween (also see FIG. 3). The bushing 148 has a circumferential flange 154 which abuts against a circumferential shoulder 156 (FIG. 6) formed inside the hole 138 to prevent the driving shaft 66 from disengaging from the vibration generating base 82.

With reference to FIGS. 2 and 4–6, the setting ring 18 has a cylindrical side wall 158 with a cap portion 160 secured to one end thereof and having an opening 162 (FIG. 6) to receive therethrough the outer section 104 of the driving shaft 66. The opening 162 of the setting ring 18 is bearingly supported on the circumferential ring 102 of the driving shaft 66 and the side wall 158 of the setting ring 18 extends substantially to such a position slightly overlapping the top opening 84 of the housing member 74.

The setting ring 18 has therein a first ring-like inner wall 164 on which at least an elongated rib 166, preferably three, extending from the opening 162 toward the mode switching ring 108 to be drivingly engageable with slots 168 formed on the mode switching ring 108 so that by the rotation of the setting ring 18, the mode-switching ring 108 is rotated to have the projections 146 thereof moved into and/or out of the notches 142 of the vibration generating base 82.

The setting ring 18 has also formed therein a second ring-like inner wall 170 surrounding the first inner wall 164. The second inner wall 170 is divided into a number of sections 172, preferably three, each defining on the free edge thereof a number of segments 174, preferably five, having step-by-step reduced heights so that the heights thereof are changed from the shortest one 174″ to the highest one 174″. Preferably, each of the segments 174 has a round or arcuate end contour.

A ring member 176 (FIG. 2) having a number of raised pimples 178, corresponding to the sections 172 of the second inner wall 170 of the setting ring 18 is disposed between the helical spring 96 and the second inner wall 170 with the pimples 178 in contact engagement with the sections 172 of the second inner wall 170. A collar 180 which is fit over the cylindrical vibration generating base 82 and which has a side flange 182 to support the spring 96 is interposed between the ring member 176 and the helical spring 96 to support and guide the helical spring 96.

With such an arrangement, the rotation of the setting ring 18 along a first direction moves the sections 172 of the second inner wall 170 relative to the ring member 176 from one segment 174 thereof to a next one and thus change the length of the helical spring 96. The change in length of the helical spring 96 results in a change of force applied to the spherical members 94 by the spring 96. This in turn changes the resistance against the spherical members 94 moving from one of the recessed sections 72 of the inward flange 68 of the adjusting ring gear 58 to the next one and thus the force resisting the rotation of the adjusting ring gear 58.

Apparently, when the pimples 178 are located on the highest segments 174″ of the sections 172 of the second inner wall 170, the spring 96 is compressed most and the force acting upon the spherical members 94 is the largest which in turn makes the adjusting ring gear 58 most difficult to rotate and thus may be considered stationary, if the spring 96 is properly selected. The more difficult to rotate the adjusting ring gear 58, the slower it rotates and the faster the third planetary gears 60 orbits about the third sun gear 56 and as a consequence, the driving shaft 66 is rotated faster.

On the other hand, if the pimples 178 are located on the shortest segments 174′ of the sections 172 of the second inner wall 170, the spring 96 is compressed least and the force acting upon the spherical members 94 is the smallest which in turn makes the adjusting ring gear 58 easiest to rotate. The easier to rotate the adjusting ring gear 58, the faster it rotates and the slower the third planetary gears 60 orbit about the third sun gear 56 and as a consequence, the driving shaft 66 is rotated slower. By this way, the output speed of the driving shaft 66 is adjustable. In accordance with the present invention, each of the segments 174 of the sections 172 of the second inner wall 170 corresponds to one of the torque output levels which are designated by the reference 20 in FIG. 1 and respectively numbered 1–5 so that the rotation of the setting ring 18 between different output levels changes the force of the spring 96 acting upon the spherical members 94 so as to set the rotational speed of the driving shaft 66 to the desired value.

Preferably, a stop 184 is formed next to the highest segment 174″ and the shortest segment 174′ of each of the sections 172 of the second inner wall 170 to prevent the helical spring 96 from further elongation or compression.

The locations of the notches 142 on the step 140 of the vibration generating base 140 are so selected that only when the setting ring 18 is further rotated from the position where the helical spring 96 is compressed most, the projections 146 are allowed to enter the notches 142 and thus allowing the shoulder 144 of the mode switch ring 108 to be in direct contact with the step 140, as shown in FIG. 5, and this corresponds to the vibration mode of the dual-function electrical hand drill 10 of the present invention.

By using the setting ring 18 to set the dual-function electrical hand drill 10 to the vibration mode, as shown in FIG. 5, a reaction force F (FIG. 5) reacts against the driving shaft 66 through the drilling bit (not shown) and the chuck 16 by the work piece (not shown), and moves the shaft 66, against the conical spring 112, toward the serrated bottom 136 of the recess 134 formed inside the vibration generating base 82 to have the serrated end surface 130 of the ring member 124 to engage the serrated bottom 136 so as to generate a vibration or to-and-fro movement of the driving shaft 66 relative to the vibration generating base 82.

The notches 142 have such a depth and the conical spring 112 has such an overall compression that when the projections 146 are out of engagement therewith, as shown in FIG. 4, wherein the shoulder 144 of the mode switching ring 108 is supported above the step 140 by the projections 146, the compression of the conical spring 112 does not allow the serrated end surface 130 of the ring member 124 to engage the serrated bottom 136 of the recess 134 formed inside the vibration generating base 82 and thus no vibration or to-and-fro movement of the driving shaft 66 relative to the vibration generating base 82 is generated.

It is apparent that although the invention has been described in connection with the preferred embodiment, it is contemplated that those skilled in the art may make changes to the preferred embodiment without departing from the scope of the invention as defined in the appended claims.

What is claimed is:

1. A dual-function electrical hand drill comprising:

a casing defining therein an interior space;

a motor securely fixed inside the interior space of the casing, the motor having an output spindle to which a speed reduction gear train is mounted to be rotatable therewith;

a power source for driving the motor, the power source being controlled by a power switch;

a driving shaft which is coupled to the speed reduction gear train to be driven thereby and releasably engageable by a chuck to transmit torque from the motor to the chuck;

a setting ring which is rotatably fit over the driving shaft to be rotatable between a plurality of predetermined angular positions of which one corresponds to a vibration operation mode and the remaining positions correspond to different torque output levels of a rotation operation mode;

speed control means which control rotational speed of the driving shaft in correspondence with the torque output levels set by the setting ring; and vibration means comprising:

a vibration generating base which is securely fixed inside the casing, the vibration generating base comprising a cylindrical body having formed therein a recess with a circumferential step formed therein, a plurality of notches being formed on the step;

a mode switching ring rotatably fit over the driving shaft and having an end received within the recess of the vibration generating base, comprising a circumferential shoulder on which a plurality of projections are formed, corresponding to the notches of the vibration generating base, to be receivable within the notches of the vibration generating means, the projections having lower ends to support the mode switching ring on the step of vibration generating base, the mode switching ring further comprising at least one slot to drivingly engage a rib formed inside the setting ring so that the rotation of the setting ring from the rotation operation mode into the vibration operation mode moves the projections of the mode switching ring into the notches of the vibration generating base and has the shoulder in direct contact engagement with the step to be directly supported thereby;

a serration formed on a bottom of the recess of the vibration generating base;

a ring member which is press fit over the driving shaft at a pre-determined position, the ring member having a serrated end surface facing the serration formed inside the recess of the vibration generating base to be engageable therewith when the projections of the mode switching ring are received within the notches of the vibration generating base.

biasing means disposed between the driving shaft and the mode switching ring to bias the driving shaft away from the serrated bottom of the recess of the vibration generating base so that a reaction force that is caused by operating on a work piece moves the driving shaft against the biasing means to have the serrated end surface of the ring member engage the serration formed inside the vibration generating base and thus generate a to-and-fro vibration of the driving shaft relative to the casing by sliding movement occurring between the serrated end surface of the ring member and the serrated bottom of the recess of the vibration generating base and the biasing force provided by the biasing means.

2. The dual-function electrical hand drill as claimed in claim 1, wherein each of the notches formed inside the vibration generating base comprises an inclined side edge to cooperate with an inclined side of the respective projection formed on the mode switching ring for helping the projections moving out of the notches when the setting ring is rotated from the vibration operation mode to the rotation operation mode.

3. The dual-function electrical hand drill as claimed in claim 1, wherein the vibration generating base comprises three notches formed on the recess thereof and the mode switching ring has, corresponding to the three notches, three projections formed on the shoulder thereof.

4. The dual-function electrical hand drill as claimed in claim 1, wherein the driving shaft comprises an expanded, circumferential ring portion which divides the driving shaft into an inner section which is received within the vibration generating base to have a free end thereof, engaged by the speed reduction gear train and an outer section which extends out of the setting ring through an opening thereof to be engageable by the chuck, and wherein the biasing means comprises an inner shoulder formed inside the mode switching ring to cooperate with the circumferential ring of the driving shaft for retaining therein a biasing spring, the biasing spring having a first end abutting against the circumferential ring of the driving shaft and an opposite second end supported by bearing means on the inner shoulder of the mode switching ring.

5. The dual-function electrical hand drill as claimed in claim 4, wherein the biasing spring comprises a conical spring.

6. The dual-function electrical hand drill as claimed in claim 1, wherein the speed reduction gear train comprises at least an output stage planetary gear set which has a sun gear driven by the spindle of the motor to rotate about a rotational axis thereof, a ring gear which is rotatable about the rotational axis and a plurality of planetary gears engageable therebetween, the planetary gears being rotatably mounted to an adapter which has an engaging hole formed thereon to receive and engage the free end of the inner section of the driving shaft, the ring gear having an inward flange formed on an end thereof to define thereon a ring-like end surface on which a plurality of raised sections are provided to define therebetween recessed sections and wherein the speed control means comprises a plurality of holes formed on a circumferential flange of the vibration generating base to receive therein spherical members, the spherical members having a portion thereof projecting out of the holes to be seated in the recessed sections formed on the end surface of the ring gear, a helical spring having a first end acting upon the spherical members with a washer therebetween to force the spherical members against the ring gear, the helical spring having a second end supported and guided by a collar which has a flange to support the helical spring and which is movably fit over the vibration generating base, spring force changing means formed inside the setting ring to change length of the helical spring in accordance with the torque output level set by the setting ring so as to apply forces of different magnitudes determined by the length of the helical spring to the spherical members which forces in turn provide a resistance to the rotation of the ring gear about the rotational axis.

7. The dual-function electrical hand drill as claimed in claim 6, wherein the spring compression means comprises an inner wall formed inside the setting ring, the inner ring comprising at least a section divided into a plurality of segments having heights reduced step by step from a highest one to a shortest one and a ring having at least a pimple to be in contact engagement with one of the segments of the section of the inner wall, the ring being interposed between the inner wall of the setting ring and the collar which supports the helical spring so that by the rotation of the setting ring, the pimple moves from one of the segments to the next one and thus changing the length of the helical spring.

8. The dual-function electrical hand drill as claimed in claim 6, wherein the speed reduction gear train further comprises a first planetary gear set having a sun gear securely mounted to the spindle of the motor, a ring gear fixed inside the casing and a plurality of planetary gears engageable therebetween, the first planetary gears being in mechanical coupling to the sun gear of the output stage planetary gear set to be rotatable therewith about the rotational axis.

9. The dual-function electrical hand drill as claimed in claim 8, wherein the speed reduction gear train further comprises a second planetary gear set having a sun gear to which the planetary gears of the first planetary gear set are rotatably mounted, a plurality of planetary gears engaging the sun gear, which planetary gears are rotatably secured to the sun gear of the output stage planetary gear set and engagingly disposed inside a ring gear of the second planetary gear set to orbit about the rotational axis, the second-ring gear being movable between a rotatable position and a fixed position in which an outer toothed section of the second ring gear engages a ring gear fixed inside the casing so as to fix the second ring gear inside the casing.

10. The dual-function electrical hand drill as claimed in claim 9, further comprising control means which comprises a circumferential groove formed on the second ring gear and a control lever having two legs partially received within the groove of the second ring gear to move the second ring gear between the fixed position and the rotatable position, the control lever being coupled to a switch slidably mounted on an outer surface of the casing to control the control lever for moving the second ring gear.

11. The dual-function electrical hand drill as claimed in claim 1, further comprising a housing member secured to the motor to house therein the speed reduction gear train, the vibration generating base being secured to the housing member to be fixed relative to the motor and the casing.

12. The dual-function electrical hand drill as claimed in claim 1, further comprising a housing member secured to the motor to house therein the speed reduction gear train, the vibration generating base being secured to the housing member to be fixed relative to the motor and the casing.

13. The dual-function electrical hand drill as claimed in claim 6, further comprising a housing member secured to the motor to house therein the speed reduction gear train, the housing having formed therein a circumferential inner groove to securely receive and fix therein the flange of the vibration generating base on which the holes for receiving therein the spherical members are formed.

14. The dual-function electrical hand drill as claimed in claim 9, further comprising a housing member secured to the motor to house therein the speed reduction gear train, the housing having formed therein a circumferential inner groove to securely receive and fix therein the flange of the vibration generating base on which the holes for receiving therein the spherical members are formed, the ring gear with which the second ring gear is engageable in the fixed position being formed inside the housing member.

15. The dual-function electrical hand drill as claimed in claim 12, wherein the housing is made of plastic material and formed by injection molding.

16. The dual-function electrical hand drill as claimed in claim 13, wherein the housing is made of plastic material and formed by injection molding.

17. The dual-function electrical hand drill as claimed in claim 14, wherein the housing is made of plastic material and formed by injection molding.

* * * * *